United States Patent
Yount

(10) Patent No.: US 9,162,162 B2
(45) Date of Patent: Oct. 20, 2015

(54) LIQUID FLOW WITH GAS MIXING

(71) Applicant: Rolls-Royce North American Technologies, Inc., Indianapolis, IN (US)

(72) Inventor: Randall E. Yount, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 48 days.

(21) Appl. No.: 14/109,039

(22) Filed: Dec. 17, 2013

(65) Prior Publication Data

US 2014/0260980 A1    Sep. 18, 2014

Related U.S. Application Data

(60) Provisional application No. 61/778,278, filed on Mar. 12, 2013.

(51) Int. Cl.
*B01D 19/00*    (2006.01)

(52) U.S. Cl.
CPC .......... *B01D 19/0005* (2013.01); *B01D 19/0036* (2013.01); *B01D 19/0042* (2013.01)

(58) Field of Classification Search
CPC ............. B01D 19/005; B01D 19/0031; B01D 19/0036; B01D 19/0042
USPC ............................................ 95/46; 96/4, 6, 7
See application file for complete search history.

(56) References Cited

U.S. PATENT DOCUMENTS

| | | | |
|---|---|---|---|
| 1,747,687 A | * | 2/1930 | Wheeler ..................... 261/75 |
| 3,229,446 A | | 1/1966 | Sebastian et al. |
| 3,590,559 A | | 7/1971 | Bragg et al. |
| 3,691,730 A | | 9/1972 | Hickey et al. |

(Continued)

FOREIGN PATENT DOCUMENTS

| | | |
|---|---|---|
| EP | 211685 A2 | 2/1987 |
| EP | 242280 A1 | 10/1987 |

(Continued)

OTHER PUBLICATIONS

Morris, Robert W. Jr. et al. "Fuel Deoxygenation and Aircraft Thermal Management." 4th International Energy Conversion Engineering Conference and Exhibit (IECEC), Jun. 26-29, 2006, San Diego, California.

(Continued)

*Primary Examiner* — Jason M Greene
(74) *Attorney, Agent, or Firm* — Fishman Stewart Yamaguchi PLLC; Douglas P. LaLone

(57) ABSTRACT

A system for removing oxygen from a fuel is provided including a pressurized gas lumen and a liquid transport lumen having a fuel separation device. The liquid transport lumen is positioned partially within the pressurized gas lumen and includes a plurality of openings formed along its length within said pressurized gas lumen. A shearing feature is formed within the liquid transport lumen and is positioned downstream of the openings and upstream of the fuel separation device. The gas enters the liquid transport lumens through the openings to form a plurality of bubbles removing oxygen from the fuel. The shearing feature collapses the bubbles into larger bubbles prior to flow into the fuel separation device.

20 Claims, 2 Drawing Sheets

(56) References Cited

U.S. PATENT DOCUMENTS

| | | | |
|---|---|---|---|
| 3,710,549 | A | 1/1973 | Nichols et al. |
| 3,722,180 | A | 3/1973 | Boucher et al. |
| 3,732,668 | A | 5/1973 | Nichols |
| 3,788,039 | A | 1/1974 | Bragg |
| 4,268,280 | A | 5/1981 | Fujii et al. |
| 4,365,978 | A | 12/1982 | Scott |
| 4,743,405 | A * | 5/1988 | Durao et al. ............ 261/76 |
| 4,931,225 | A * | 6/1990 | Cheng ............ 261/76 |
| 5,403,475 | A | 4/1995 | Allen |
| 6,237,897 | B1 * | 5/2001 | Marina ............ 261/64.1 |
| 6,767,007 | B2 * | 7/2004 | Luman ............ 261/76 |
| 7,153,343 | B2 | 12/2006 | Burlatsky et al. |
| 7,459,081 | B2 | 12/2008 | Koenig et al. |
| 2002/0083713 | A1 | 7/2002 | Loebig et al. |
| 2008/0083608 | A1* | 4/2008 | Cipollini ............ 96/4 |
| 2010/0242736 | A1* | 9/2010 | Herring et al. ............ 96/193 |
| 2012/0103194 | A1 | 5/2012 | Sohn et al. |

FOREIGN PATENT DOCUMENTS

| | | | | |
|---|---|---|---|---|
| EP | | 472967 | A1 | 3/1992 |
| EP | | 1202796 | A2 | 5/2002 |
| GB | | 1156417 | * | 6/1969 ............ B01D 19/00 |
| GB | | 1156417 | A | 6/1969 |
| WO | WO-0076646 | A2 | | 12/2000 |

OTHER PUBLICATIONS

N. K. et al. "Influence of Atomizer Design Features on Mean Drop Size." *AIAA Journal*, Aug. 1983, 21(8): pp. 1139-1142.

Darrah, S. "Jet Fuel Deoxygenation." Oct. 1988, Interim Report for Period Mar. 1987-Jul. 1988, Aero Propulsion Laboratory, Air Force Wright Aeronautical Laboratories, Air Force Systems Command, Wright-Patterson Air Force Base, Ohio 45433-6563.

Branchini, R. 'Aircraft Fuel Deoxygenation (Deox).' Retrieved from: Rolls Royce Capability Intranet, Chapter 3.1 Heat Management, 2010.

International Search Report for PCT/US2013/075496 mailed Apr. 24, 2014.

English Abstract for EP0242280.

English Abstract for EP0211685A2.

English Abstract for EP0472967.

Abstract and Corresponding document WO0076646A2 for EP1202796A2 (Abst. not available).

* cited by examiner

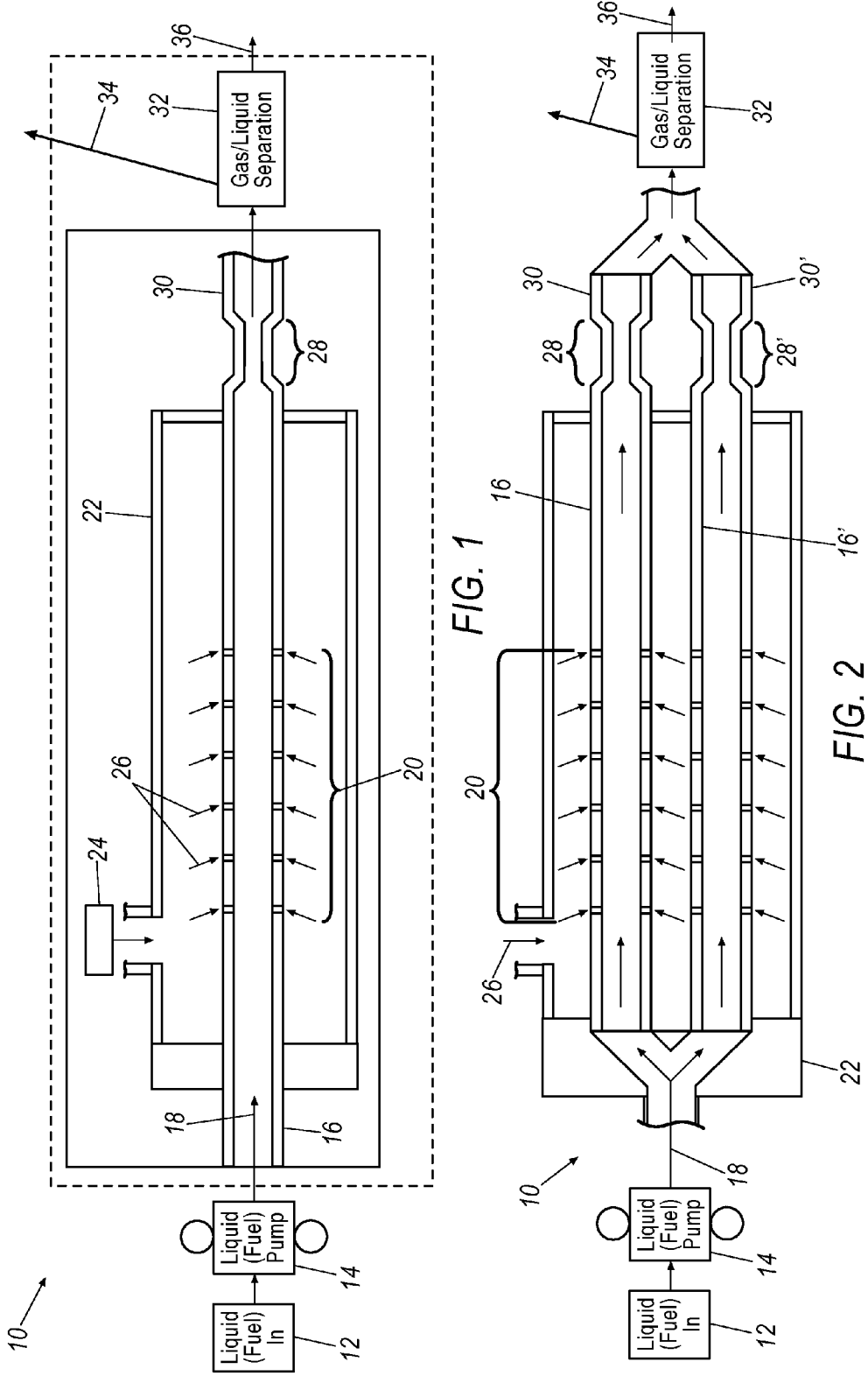

US 9,162,162 B2

LIQUID FLOW WITH GAS MIXING

CROSS-REFERENCE TO RELATED APPLICATIONS

This application claims priority to U.S. Provisional Patent Application No. 61/778,278 filed Mar. 12, 2013, the contents of which are hereby incorporated in their entirety.

FIELD OF TECHNOLOGY

Without limitation, some embodiments of the disclosure relate to the field of removal of dissolved oxygen from liquid hydrocarbon fuels.

BACKGROUND

There exists a need and desire to remove dissolved oxygen from a variety of liquids. Removal of oxygen can reduce undesired chemical interactions and improve the usability of many liquids. In the case of fuel, de-oxygenated fuel is known to have increased thermal stability. This means that de-oxygenated fuel can absorb more heat, resulting in higher fuel temperature, without forming flow-reducing coke deposits. In gas turbine engines, such a higher heat capacity fuel can enhance low emission fuel systems, can be used as an effective heat sink for engine and aircraft heat loads, and can reduce engine fuel consumption.

Existing oxygen removal systems commonly involve static mixers, which utilize internal obstructions to generate a complex fuel-flow pathway involving mixing vanes and/or barriers. This is required to stir the fuel flow in order ensure proper fuel interaction with de-oxygenation gases or membranes. This can add considerably to the bulk of de-oxygenation systems, may limit flow rates, and thereby limit their application locations. In addition, their complex flow pathways are often susceptible to debris within the fluid/fuel, which can build up and cause blockage of flow.

Overcoming these concerns would be desirable and could allow for a more efficient and adaptable de-oxygenation of fuel at a variety of locations. This, in turn, would allow for an increase in the thermal stability of fuel and an increase in efficiency of systems utilizing such fuel.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 1 illustrates a cross-section of a fluid de-oxygenation system in accordance with an embodiment of the present disclosure;

FIG. 2 illustrates a cross-section of a fluid de-oxygenation system in accordance with a second embodiment of the present disclosure;

DETAILED DESCRIPTION

Figure 3:
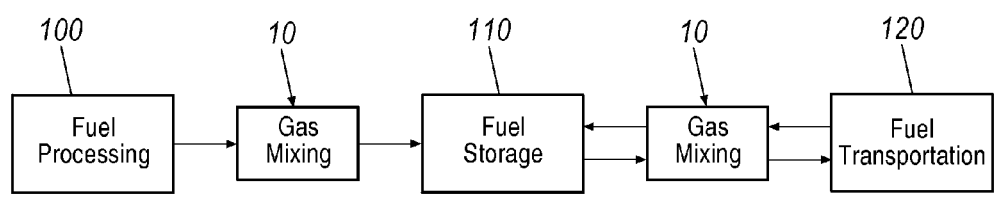
FIG. 3 illustrates a process diagram of fuel distribution and consumption indicating potential positions for integration of the fluid de-oxygenation system in accordance with some embodiments.

An exemplary system for removing oxygen from fuel is described herein and is shown in the attached drawings. The system utilizes a process similar to those used in effervescent atomizers to inject gas into a flowing liquid. The dissolved oxygen in the liquid diffuses into the resultant gas bubbles in an established process referred to as sparging. The present disclosure makes use of such techniques in order to remove dissolved oxygen from hydrocarbon fuels.

FIG. 1 is an illustration of a fluid de-oxygenation system 10 in accordance with one embodiment of the present disclosure. The system 10 includes a liquid/fuel source 12 that is transported by way of a liquid/fuel pump 14 into a liquid/fuel transport lumen 16. It is contemplated that the liquid transport lumen 16 may be any of a variety of transport pathways, although a smooth walled tube is preferred. The use of a smooth walled liquid transport lumen 16 without mixing vanes or barriers ensures proper flow of the transport liquid/fuel 18 through the de-oxygenation system 10 and prevents build-up or blockages from impacting performance. Although the present disclosure is applicable to a variety of liquids, the present disclosure contemplates the transport liquid/fuel 18 to be a hydrocarbon fuel in one embodiment.

The liquid/fuel transport lumen 16 includes a plurality of openings 20 formed therein. It is contemplated that these openings may comprise a variety of shapes, quantity, spacing, and diameter configured to produce turbulent mixing of gas bubbles into fuel 18 flowing within the liquid/fuel transport lumen 16. The size of each of the plurality of openings 20 may be large enough to prevent blockages from imperfections in the liquid/fuel 18. The portion of the liquid/fuel transport lumen 16 containing the openings 20 is positioned within a pressurized gas lumen 22 or similar enclosure. The pressurized gas lumen 22 is in communication with a gas source 24 which fills the pressurized gas lumen 22 with a de-oxygenating gas 26. Although a variety of de-oxygenating gases are contemplated, one embodiment contemplates the use of nitrogen. Another embodiment contemplates the use of air (i.e., about 78% nitrogen). It should be understood, however, that any gas that attracts dissolved oxygen from a liquid could be utilized.

The pressurized de-oxygenating gas 26 fills the pressurized gas lumen 22 and passes through the plurality of openings 20 and into the transport liquid/fuel 18 as it passes through the liquid/fuel transport lumen 16. The pressurized gas lumen 22 may support the liquid/fuel transport lumen 16 on either end of the openings 20. The de-oxygenating gas 26 enters the transport liquid/fuel 18 along an extended length of the liquid/fuel transport lumen 16 as the liquid/fuel 18 is flowing. This allows turbulent mixing of a plurality of small bubbles of the de-oxygenating gas 26 and the fuel 18. Any dissolved oxygen in the liquid fuel diffuses to the plurality of small gas bubbles in a process referred to as sparging.

The present disclosure further includes a shearing feature 28 located in or on the liquid/fuel transport lumen 16. The shearing feature 28 is intended to encompass any feature that changes pressure and applies shear and compressive forces to the bubbles. The shearing feature 28 acts to collapse the plurality of small bubbles into larger ones making them easier to separate downstream. In one embodiment, the shearing feature 28 comprises a sudden reduction in lumen cross-section such as an orifice shaped reduction or a convergent nozzle. The shearing feature 28 variables, e.g., without limitation, shape and length and diameter, may be selected to better collapse the bubbly flow. It would be understood to one skilled in the art, in light of the present disclosure, that a variety of alterations or substitutions could be utilized to reduce the number of bubbles and increase their size.

The now de-oxygenated fuel moves from the shearing feature 28, through a continued flow section 30 of the liquid/fuel transport lumen 16 and into a gas/liquid separation device 32. The gas/liquid separation device 32 separates and separately expels the oxygen-rich gas 34 and the de-oxygenated fuel 36. It is contemplated that the gas/liquid separation device 32 may utilize any of a variety of techniques to separate the gas and liquid/fuel such as, but not limited to, spinning/centrifugation.

FIG. 2 is an illustration of a fluid de-oxygenation system 10 in accordance with another embodiment of the present disclosure. In this embodiment, the liquid/fuel transport lumen 16 may actually comprise a plurality of liquid/fuel transport lumens 16, 16'. Each of these liquid/fuel transport lumens 16, 16' contains a plurality of openings 20, 20' along its length within the pressurized gas lumen 22. This provides a more controlled and efficient de-oxygenation of the fuel 18 as it passes through the pressurized gas lumen 22. It also allows for a reduction in overall size of the fluid de-oxygenation system 10. This may allow such an embodiment to be placed onboard aircraft or other vehicles for on-board fuel processing. In at least one embodiment, each of the liquid/fuel transport lumens 16, 16' also includes its own shearing feature 28, 28' and continued flow section 30, 30' to further tailor the fuel de-oxygenation prior to flow into the gas/liquid separation device 32.

FIG. 3, illustrates the fluid de-oxygenation system 10 of the present disclosure which can be utilized at any of one or more points in the jet fuel supply chain where the fuel is flowing including its eventual consumption in a gas turbine engine. This includes anywhere from original fuel refining, fuel transportation, fuel storage, to fuel flowing through the fuel system on-board a gas turbine engine. Oxygen may be introduced during any period of fuel exposure prior to usage. The system 10 may be utilized during fuel pumped between fuel processing plants 100 and fuel storage 110. Similarly the system 10 may be set up to function on fuel as it is moved between fuel storage 110 and transportation means 120 such as trucks or pipelines. In this fashion, the oxygen may be removed from the fuel at any stage along the supply chain.

Figure 4:
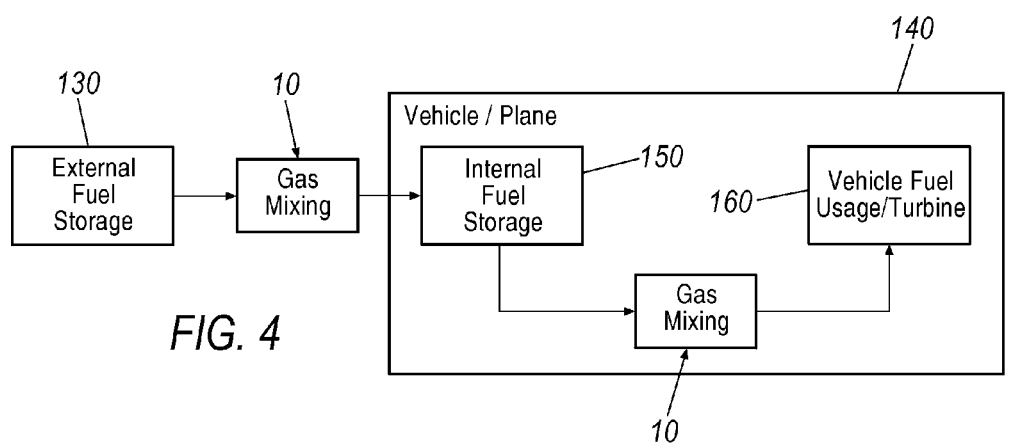
FIG. 4 illustrates additional fuel distribution and consumption positions for integration of the fluid de-oxygenation system in accordance with some embodiments.

FIG. 4, further illustrates the flexibility of the fluid de-oxygenation system 10. The system 10 may be utilized between an external fuel storage tank 130 and a vehicle/aircraft 140 such that oxygen may be removed from the fuel as it is transferred from the external fuel storage tank 130 to the vehicle/aircraft 140. Finally, the system 10, due to its flexibility, provides for in-line functioning and may be integrated directly into the vehicle/aircraft 140 such that it operates as fuel is transferred from the vehicle/aircraft 140 internal fuel tank 150 to the vehicle/aircraft engine/turbine 160. This portability and flexibility has not been previously available for fuel de-oxygenation systems.

It will be appreciated that the aforementioned systems, methods and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A fluid de-oxygenation system comprising:
   a pressurized gas lumen containing pressurized de-oxygenating gas; and
   a liquid transport lumen passing through said pressurize gas lumen, said liquid transport lumen including a plurality of openings formed along its length within said pressurized gas lumen, a shearing feature downstream of said plurality of openings, and a continued flow section downstream of said shearing feature;
   wherein said de-oxygenating gas enters said liquid transport lumen through said plurality of openings to form a plurality of bubbles within a transport liquid, said plurality of bubbles removing oxygen from said transport liquid;
   wherein said shearing feature is configured to collapse said plurality of bubbles into larger bubbles prior to flow into said continued flow section.

2. A fluid de-oxygenation system as described in claim 1, wherein said liquid flow lumen comprises a smooth walled tube.

3. A fluid de-oxygenation system as described in claim 1, wherein said shear feature comprises a reduction in lumen cross-section.

4. A fluid de-oxygenation system as described in claim 1, further comprising:
   a gas/liquid separation device in communication with said continued flow section.

5. A fluid de-oxygenation system as described in claim 1, wherein said transport liquid comprises a hydrocarbon fuel and said de-oxygenating gas comprises nitrogen.

6. A fluid de-oxygenation system as described in claim 1, further comprising:
   at least one additional liquid transport lumen positioned within said pressurized gas lumen, said additional liquid transport lumen including a plurality of openings formed along its length within said pressurized gas lumen.

7. A fluid de-oxygenation system as described in claim 6, wherein each of said additional liquid transport lumens includes a shearing feature downstream of said plurality of openings.

8. A system for removing oxygen from a fuel comprising:
   a pressurized gas lumen;
   a liquid transport lumen having a fuel separation device, said liquid transport lumen positioned partially within said pressurized gas lumen, said liquid transport lumen including a plurality of openings formed along its length within said pressurized gas lumen;
   at least one shearing feature formed within said liquid transport lumen and positioned downstream of said plurality of openings and upstream of said fuel separation device;
   wherein said de-oxygenating gas enters said plurality of liquid transport lumens through said plurality of openings to form a plurality of bubbles within a transport fuel, said plurality of bubbles removing oxygen from said transport fuel;

wherein said shearing feature is configured to collapse said plurality of bubbles into larger bubbles prior to flow into said fuel separation device.

9. A system for removing oxygen from a fuel as described in claim 8, wherein said liquid flow lumen comprises a smooth walled tubes.

10. A system for removing oxygen from a fuel as described in claim 8, wherein said shear feature comprises a reduction in lumen cross-section.

11. A system for removing oxygen from a fuel as described in claim 8, wherein said shear feature comprises a convergent nozzle.

12. A system for removing oxygen from a fuel as described in claim 8, wherein said liquid transport lumen comprises:
   a plurality of liquid transport lumens, each of said plurality of liquid transport lumens including a plurality of openings.

13. A system for removing oxygen from a fuel as described in claim 12, wherein each of said plurality of liquid transport lumens includes a shearing feature positioned downstream of said plurality of openings.

14. A system for removing oxygen from a fuel as described in claim 8, wherein said transport fuel comprises a hydrocarbon fuel and said de-oxygenating gas comprises nitrogen.

15. A method of fuel de-oxygenation comprising:
   transporting a transport liquid through a liquid transport lumen positioned within a pressurized gas lumen, said liquid transport lumen including a plurality of openings formed along its length within said pressurized gas lumen;
   feeding pressurized de-oxygenating gas into said pressurized gas lumen such that said de-oxygenating gas enters said liquid transport lumen through said plurality of openings to form a plurality of bubbles within a transport liquid, said plurality of bubbles removing oxygen from said transport liquid;
   forcing said transport liquid past a shearing feature downstream of said plurality of openings such that said plurality of bubbles are collapsed into larger bubbles;
   passing said transport liquid into a continued flow section downstream of said shearing feature.

16. A method of liquid de-oxygenation as described in claim 15, further comprising:
   passing said transport liquid from said continued flow section into a gas/liquid separation device to remove gas from said transport liquid.

17. A method of liquid de-oxygenation as described in claim 15, wherein said liquid transport lumen comprises a smooth walled tube.

18. A method of liquid de-oxygenation as described in claim 15, wherein the step of transporting a transport liquid through a liquid transport lumen comprises:
   transporting said transport liquid through a plurality liquid transport lumens positioned within said pressurize gas lumen, each of said plurality of liquid transport lumens including a plurality of openings formed along its length within said pressurized gas lumen.

19. A method of liquid de-oxygenation as described in claim 15, wherein said method is performed on-board an aircraft.

20. A method of liquid de-oxygenation as described in claim 15, wherein said method is performed at a plurality of locations along a fuel transit pathway.

* * * * *

UNITED STATES PATENT AND TRADEMARK OFFICE
CERTIFICATE OF CORRECTION

| | | |
|---|---|---|
| PATENT NO. | : 9,162,162 B2 | |
| APPLICATION NO. | : 14/109039 | |
| DATED | : October 20, 2015 | |
| INVENTOR(S) | : Randall E. Yount | |

It is certified that error appears in the above-identified patent and that said Letters Patent is hereby corrected as shown below:

In the Claims:

At column 4, claim number 1, line number 13, change "pressurize" to "pressurized".

It should read: ... passing through said pressurized gas lumen...

At column 5, claim number 9, line number 6, change "tubes" to "tube".

It should read: ... comprises a smooth walled tube.

Signed and Sealed this
Twenty-ninth Day of March, 2016

Michelle K. Lee
*Director of the United States Patent and Trademark Office*